United States Patent
Ulrich

[11] Patent Number: 5,909,308
[45] Date of Patent: Jun. 1, 1999

[54] ACHROMATIC AND ATHERMALIZED REIMAGER

[75] Inventor: Wilhelm Ulrich, Aalen, Germany

[73] Assignee: Carl-Zeiss-Stiftung, Heidenheim, Germany

[21] Appl. No.: 08/780,295

[22] Filed: Jan. 8, 1997

[30] Foreign Application Priority Data

Jan. 8, 1996 [DE] Germany .................. 196 00 336

[51] Int. Cl.⁶ .................................................. G02B 13/14
[52] U.S. Cl. .................... 359/357; 359/356; 359/362; 359/434; 250/330
[58] Field of Search .................. 359/350, 355, 359/356, 357, 362, 434; 250/330, 332

[56] References Cited

U.S. PATENT DOCUMENTS

| | | |
|---|---|---|
| 4,679,891 | 7/1987 | Roberts . |
| 5,021,657 | 6/1991 | Kettlewell et al. .................. 250/330 |
| 5,044,706 | 9/1991 | Chen .................................. 359/357 |
| 5,504,628 | 4/1996 | Borchard ........................... 359/365 |

FOREIGN PATENT DOCUMENTS

| | | |
|---|---|---|
| 0100407 | 2/1984 | European Pat. Off. . |
| 0309075 | 3/1989 | European Pat. Off. . |
| 480805 | 4/1992 | European Pat. Off. ............ 359/356 |
| 0562357 | 9/1993 | European Pat. Off. . |
| 0766113 | 4/1997 | European Pat. Off. . |
| 6-94523 | 4/1994 | Japan ................................. 250/330 |
| 2161616 | 1/1986 | United Kingdom ............... 359/356 |

OTHER PUBLICATIONS

"Achromatic doublets for simultaneous imaging of IR (10.6–μm) and visible (0.6328–μm) radiation" by A. C. Walker, Applied Optics, vol. 20 (1981), No. 24, New York.

Primary Examiner—Cassandra Spyrou
Assistant Examiner—Darren E. Schuberg
Attorney, Agent, or Firm—Walter Ottesen

[57] ABSTRACT

An achrathermalized reimager includes a front objective defining an optical axis and a relay optic arranged on the optical axis downstream of the front objective. The front objective is both achromatic and athermalized and includes precisely one negative lens made of a material selected from the group consisting of ZnSe and ZnS and one positive lens made of chalcogenide glass.

23 Claims, 8 Drawing Sheets

ACHROMATIC AND ATHERMALIZED REIMAGER

FIELD OF THE INVENTION

The invention relates to an achrathermalized reimager, that is, an achromatic and athermalized lens system comprising a front objective, an intermediate image plane of a relay optic and especially a relay optic as utilized in the infrared range of about 10 μm as an optic for thermal image apparatus.

BACKGROUND OF THE INVENTION

A reimager of this kind is disclosed in U.S. Pat. No. 4,679,891. In this reimager, the lenses are made of chalcogenide glass, zinc selenide (ZnSe), zinc sulfide (ZnS) and germanium (Ge). The front objective must have at least three lenses made of different materials which lie close one next to the other. In all examples, at least six lenses are arranged forward of the exit pupil.

SUMMARY OF THE INVENTION

It is an object of the invention to provide a high quality achromatic and athermalized reimager having the fewest lenses possible, especially for high-resolution detectors for a HDTV (high density television) format.

In the following, the two terms "achromatic" and "athermalized" are expressed as the acronym "achrathermalized". Accordingly, the achromatic and athermalized reimager is referred to hereinafter as the achrathermalized reimager.

The achrathermalized reimager of the invention includes a front objective and a relay optic. According to a feature of the invention, the front objective comprises only two lenses made of two materials, namely, a negative lens made of ZnSe or ZnS and a positive lens made of chalcogenide glass. The chalcogenide glass is especially type IG6 or IG4 made by Vitron Spezialwerkstoffe GmbH of Jena, Germany. The front objective is itself achrathermalized.

Another embodiment of the reimager of the invention is a telescope having an intermediate image with the telescope including four or five lenses for forming the image. This telescope is for the mean infrared wavelengths and especially for wavelengths in the range of 7.5 μm to 10.5 μm. The four or five lenses are achromatically better than 80% and are preferably better than 65% of the depth of field and athermally the lenses lie in a temperature range about the normal temperature such as would be expected in the field. This temperature can be −40° C. to +70° C. and the change in image distance is less than 60% of the depth of field.

Another embodiment of the reimager of the invention includes a positive lens and a negative lens each for the front objective and the relay optic with the negative lens being made of ZnSe or ZnS in each case.

The above three embodiments are exemplary of those wherein the number of lenses of an achrathermalized reimager of high quality is drastically reduced.

The invention proceeds from the recognition that both component systems (front objective and relay optic) must be independently achromatic and athermalized because otherwise the chromatic variations of image position and image size cannot be corrected simultaneously and the position of the intermediate image varies.

The construction of the reimager of the invention is based upon the solution of the following system of equations which are applicable for thin lenses without an air gap:

(1) focal length condition: $\phi_1+\phi_2=\Phi=1$
(2) achromatic condition: $\phi_1/\nu_1+\phi_2/\nu_2=0$
(3) athermalizing condition: $\tau_1*\phi_1+\tau_2*\phi_2=0$
(4) from these conditions, the following requirement results:

$$\nu_1* \tau_1=\nu_2*\tau_2$$

The individual parameters then have the following significance:

standardized refractive power of the component systems: $\Phi=1$ refractive power of the individual lenses: $\phi_1,\phi_2$ Abbe number (dispersion): $\nu=(n_{9\mu}-1) / (n_{7.5\mu}-n_{10.5\mu})$ temperature-dependent refractive index change coefficient: $dn/dT$ temperature-dependent expansion coefficient: $\alpha$ integral temperature coefficient:

$$\tau=(1+dn/dT)/(1+\alpha)-1\approx dn/dT-\alpha(\text{for } \alpha<<1)$$

In the following, the constants of different infrared transparent materials are listed.

| Material | ν | dn/dT*10⁶ | α*10⁶ | τ*10⁶ | ν*τ*10³ |
| --- | --- | --- | --- | --- | --- |
| Ge | 886 | 400 | 5.7 | 394 | 349 |
| ZnSe | 87 | 60 | 7.6 | 52 | 4.5 |
| ZnS | 35 | 43 | 7.8 | 35 | 1.2 |
| IG4 | 262 | 36 | 20.4 | 16 | 4.2 |
| IG6 | 228 | 41 | 20.7 | 20 | 4.6 |

This table shows how well different materials are adapted to each other. Here, it is especially shown how well the chalcogenide glasses IG4 and IG6 are suitable as positive lenses in a combination with a negative lens made of ZnSe. Even ZnS is suitable as a partner in the negative lens especially when achromatics are considered because the individual refractive forces can be held low because of the extreme difference in the dispersion.

According to a further feature of the invention, the relay optic comprises at most three lenses, more specifically, a negative lens made of ZnS or ZnSe and a positive lens made of the same chalcogenide glass which is already used in the front objective.

An especially advantageous embodiment of the invention is provided when the front objective and the relay optic are configured to be both achromatic and athermalized.

According to another feature of the invention, a uniform distribution of the refractive forces is provided. Here, no lens has more than 2.2 times the refractive power of the total system.

In another embodiment, one or two aspheric lens surfaces are provided of which one is in the front objective. According to another feature of the invention, the aspherical lenses are rotationally symmetrical and the arrow height p, as a function of the radius h, is a power-series development having only even exponents, that is:

$$p(h) = h^2\left(R\left(1 + \sqrt{1 - (1+k)h^2/R^2}\right)\right) + c_1h^4 = \ldots + c_nh^{2n+2}$$

wherein: R=apex radius, k=conical constant, $c_1 \ldots c_n$ are aspherical constants. The aspherical data for this power-series development is provided in the tables.

According to still another feature of the invention, all positive lenses are made of chalcogenide glass such as is the case in the embodiments shown and because of the characteristics shown in Table 1.

Conventionally available infrared detector units are adapted by providing a planar-parallel plate between the last two lenses and the exit pupil. These infrared detector units are available arranged linearly as in Examples 1 to 7 (infra) or as two-dimensional arrays as presented in Examples 8 to 10 (infra).

These detectors must be cooled to suppress background signals and are therefore built into Dewar vessels which have a window made of a germanium plane-parallel plate as an inlet for the IR radiation. The construction of all other embodiments considers the arrangement of a plane-parallel plate made of germanium and the position of the exit pupil.

A narciss diaphragm is provided in the intermediate image plane. This diaphragm prevents, to a significant extent, that infrared radiation of the IR detector reaches the IR detector via reflection on a lens surface.

The narciss diaphragm in the intermediate image plane also functions to adapt to the detector. Accordingly, disturbing back reflections of the IR radiation emanating from the detector are thereby avoided as far as possible.

According to still another feature of the invention, tolerances of ±0.5% focal length variation over a temperature range of −40° C. to +70° C. as well as wavelengths of 7.5 $\mu$m to 10.5 $\mu$m are provided, more specifically, the maximum focal intercept difference within the diffraction-limiting depth of field of ±40 $\mu$m. This difference or displacement is presented in Table 11 and is the difference between the real focal intercept caused by temperature and wavelength and the desired focal intercept for nominal or reference conditions. Characterizing the lens system of the invention as achrathermalized is therefore appropriate.

In another feature of the invention, the lenses of the front objective are made of only two different materials. In the front objective or in the entire reimager, only two lens materials are satisfactory. The material of the detector entry window does not belong thereto. At least one material less is needed compared to the reimager disclosed in U.S. Pat. No. 4,679,891.

According to another feature of the invention, a plane-parallel plate is mounted behind the front objective and can be tilted. A two-dimensional raster detector array is mounted in the image plane and tilting the plane-parallel plate effects an offset of the image and thus makes possible the "interlace" method for an increase in resolution.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
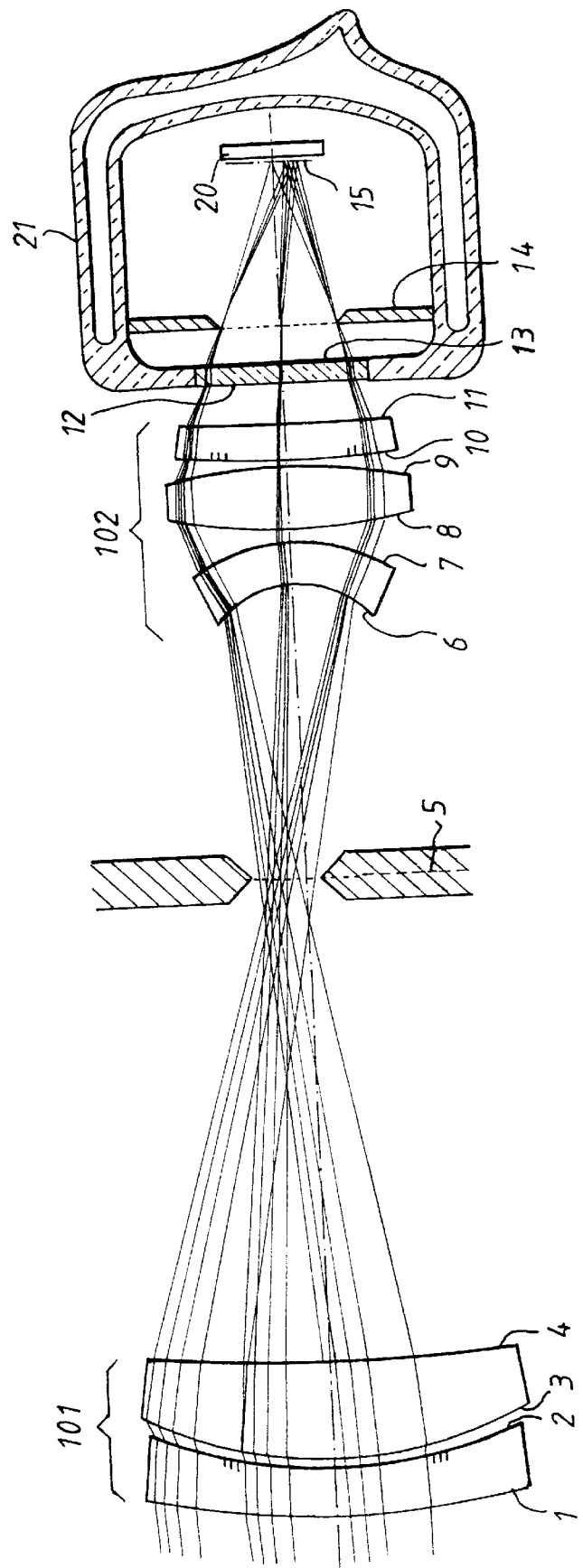
FIG. 1 is a section view of a first embodiment of the reimager of the invention wherein the reimager includes five lenses.

The five-lens achrathermalized reimager shown in FIG. 1 corresponds to Example 1 in Table 12. This reimager comprises a front objective 101 and a relay optic 102 which can also be characterized as an ocular. An IR line detector 20 is mounted in the image plane 15. The IR line detector is cooled and is seated in a Dewar vessel 21 for isolation. The Dewar vessel 21 has a window made of germanium which has two plane-parallel surfaces (12, 13).

A cooled aperture diaphragm (cold shield) is mounted in the exit pupil 14. A narciss diaphragm is mounted in the intermediate image plane 5. The exit pupil 14 is at a distance forward of the intermediate image plane 15 of 4 to 8 times half of the image diagonal. The half diagonal of the image is identified by reference numeral 50 in FIG. 1. For a circularly-shaped object the half diagonal is the image field radius. In the case of a rectangularly-shaped object, the image diagonal would be the diagonal of the rectangular image. The section view presented in FIG. 1 is along an image diagonal.

The front objective includes a negative meniscus lens made of ZnSe having the surfaces 1 and 2 with the rear surface 2 being aspheric and a positive lens made of the chalcogenide glass IG6 made by Vitron, Jena, Germany having surfaces 3 and 4.

The relay optic includes a negative meniscus lens made of ZnSe, a positive lens of IG6 and a weakly positive germanium lens having an aspheric front surface 10 and the rear surface 11. Table 1 provides the radii and spacings and additional data.

Figure 2:
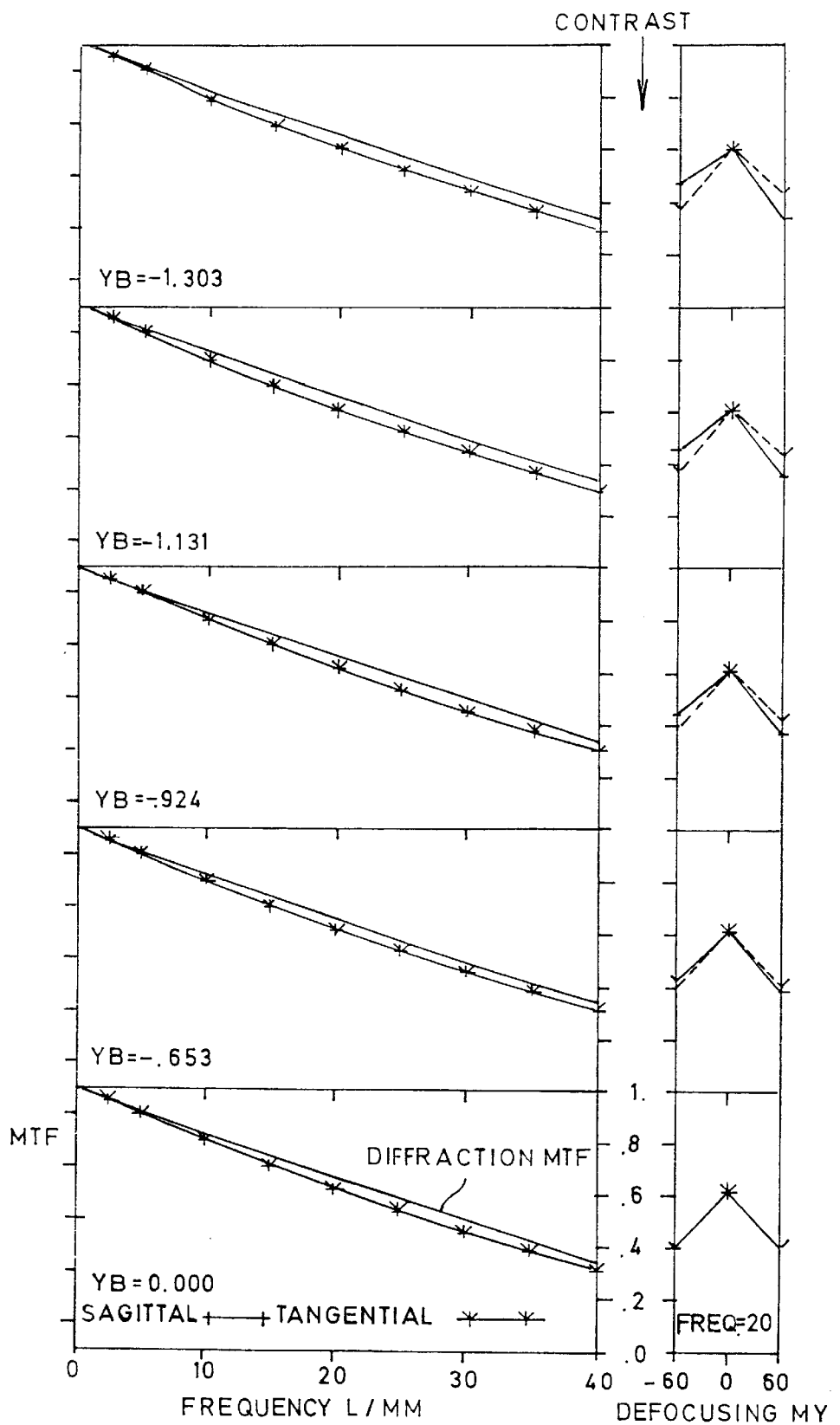
FIG. 2 shows the diffraction modulation transfer function and the contrast as a function of the defocusing for different image heights.

FIG. 2 shows the diffraction modulation transfer function obtained with the embodiment shown in FIG. 1. FIG. 2 also shows the contrast as a function of defocusing for various ray heights.

Contrast in the radial as well as in the tangential direction is nearly diffraction limited.

The additional embodiments require only four lenses having two aspherical surfaces.

Figure 3:
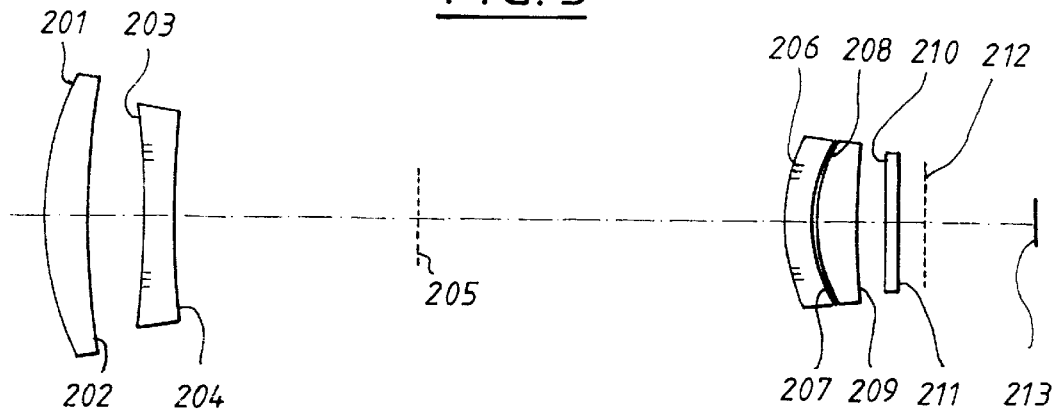
FIGS. 3 to 8 are lens section views of the four lenses in accordance with Examples 2 to 7, respectively.

FIG. 3 is a lens section view of the second embodiment of the invention and Table 2 provides data therefor. The germanium plane-parallel plate (210, 211), the exit pupil 212 and the image plane 213 correspond to the data shown in FIG. 1. Here, three materials are used, namely: ZnS, ZnSe and IG6.

Figure 4:
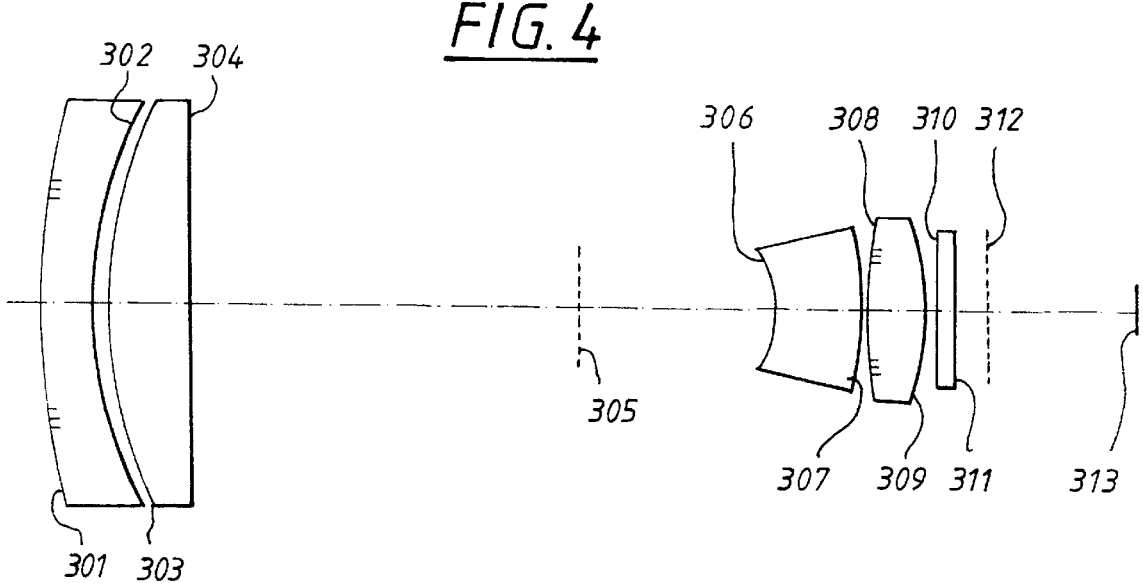

FIG. 4 is a lens section view of the third embodiment and data therefor is provided in Table 3. Here, only ZnSe and IG6 are used. The surface 308 is aspheric which, however, is not as easily manufactured from IG6 glass as is the case for ZnSe or ZnS.

Figure 5:
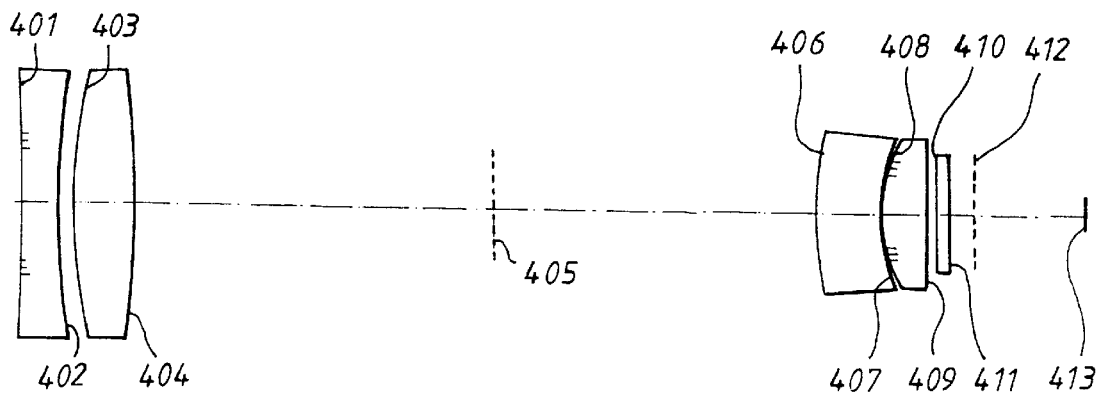

FIG. 5 is a lens section view for the fourth example and data is presented therefor in Table 4.

Figure 6:
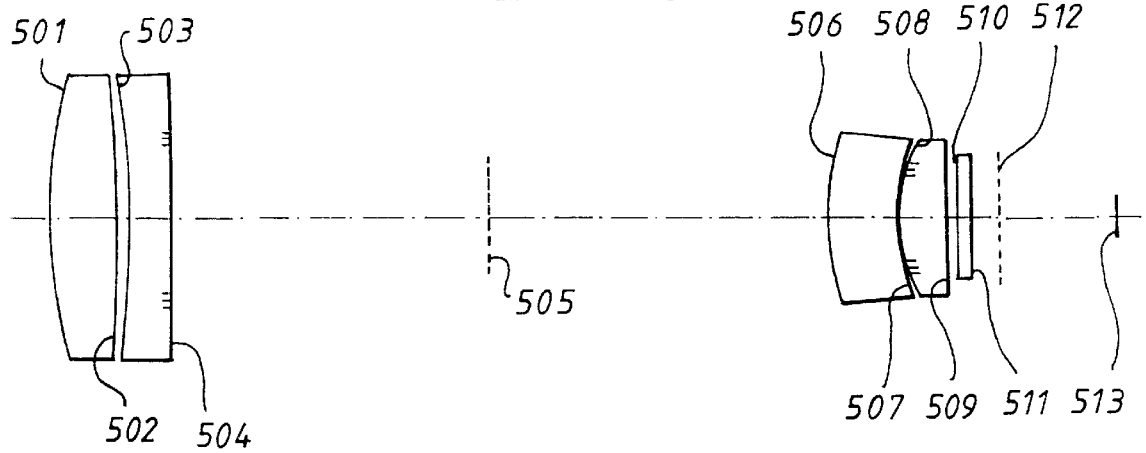

FIG. 6 shows a fifth embodiment and the data therefor is presented in Table 5.

Figure 7:
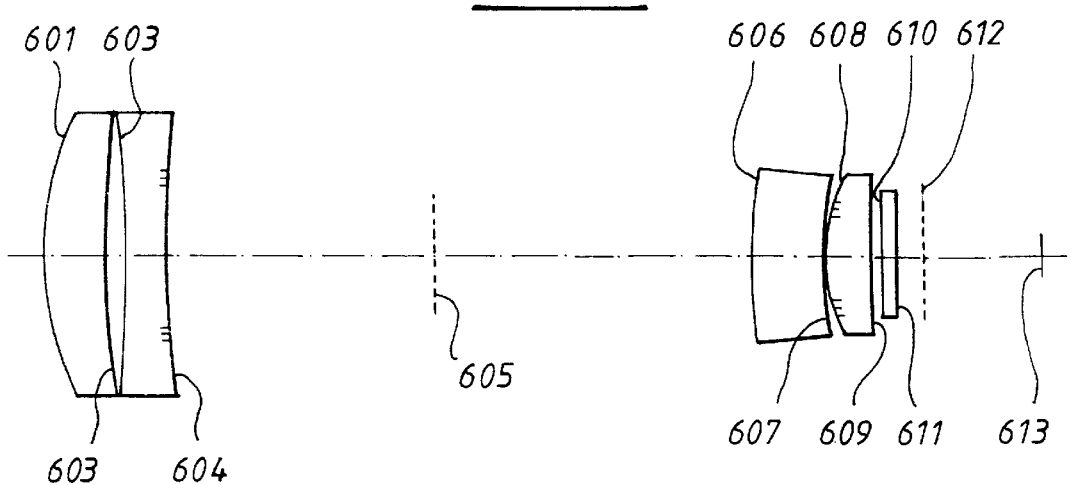

FIG. 7 shows a sixth embodiment and the data therefor is presented in Table 6.

Figure 8:
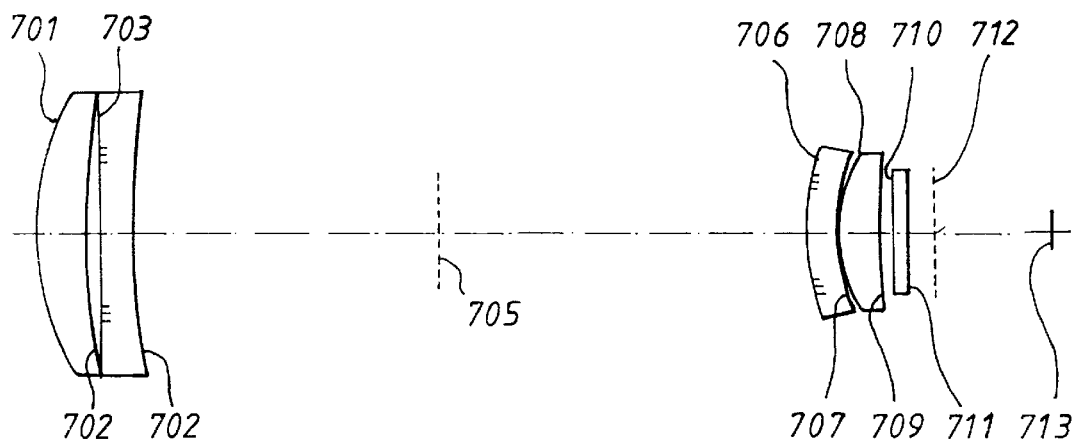

FIG. 8 shows a seventh embodiment and the data therefor is presented in Table 7.

Figure 9:
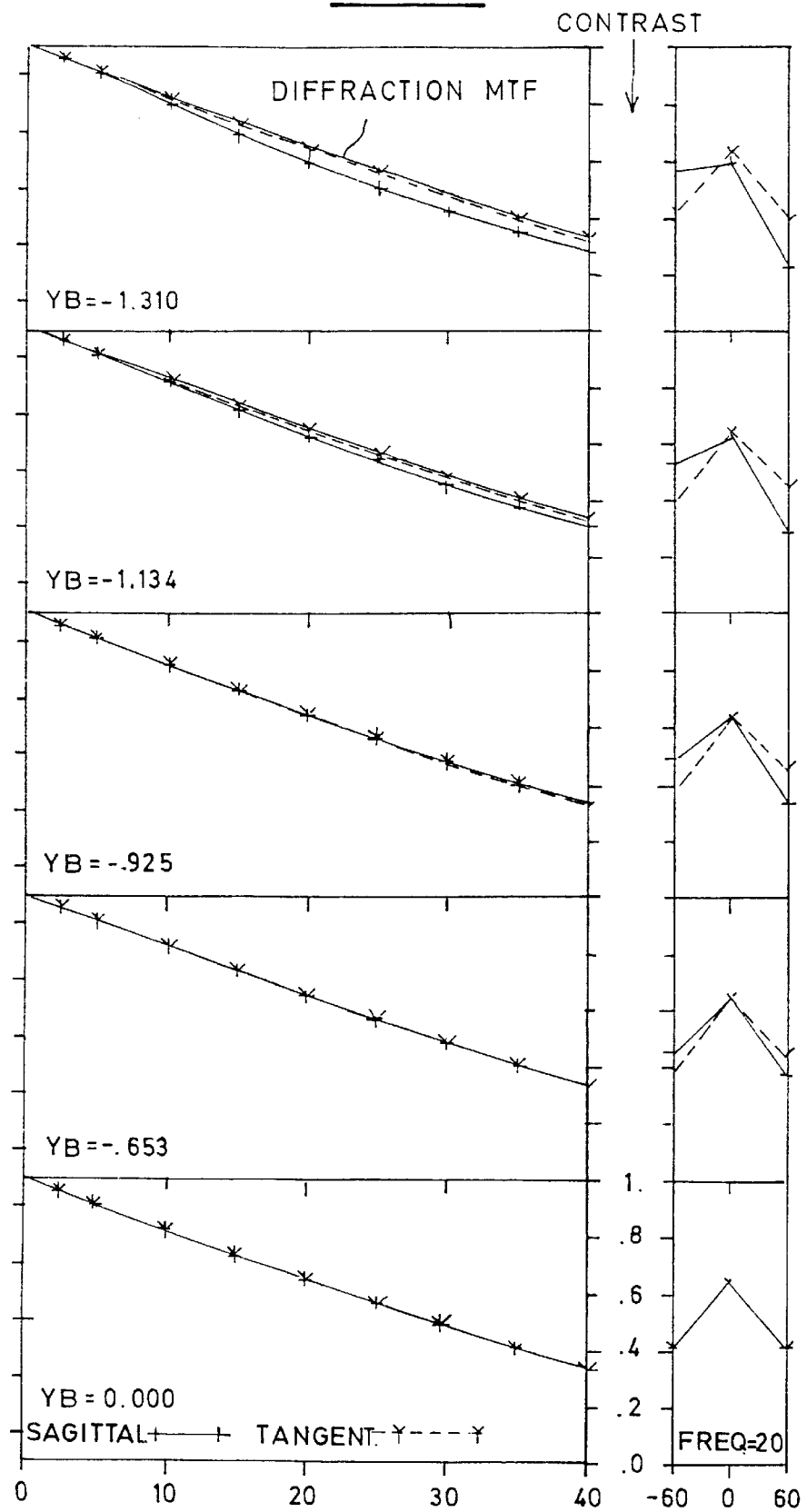
FIG. 9 shows the diffraction modulation transfer function and the contrast as a function of the defocusing for different ray elevations for Example 7.

For the foregoing, FIG. 9 is a view which corresponds to FIG. 2 and shows the modulation transfer function and the contrast as a function of defocusing for different ray elevations YB at a spatial frequency of 20 lines/mm.

A diffraction limited correction is present almost to the edge of the image.

The examples shown above illustrate embodiments for use with line detectors as they are presently conventional for infrared cameras. The examples show that excellent achromatic and athermalized reimagers can be obtained in many variations with only four to five lenses with only two or at most three materials while utilizing two aspheric surfaces.

More lenses are however also not needed when the configuration is for a two-dimensional detector array in accordance with HDTV standards. The following examples are configured for this purpose.

Figure 10:
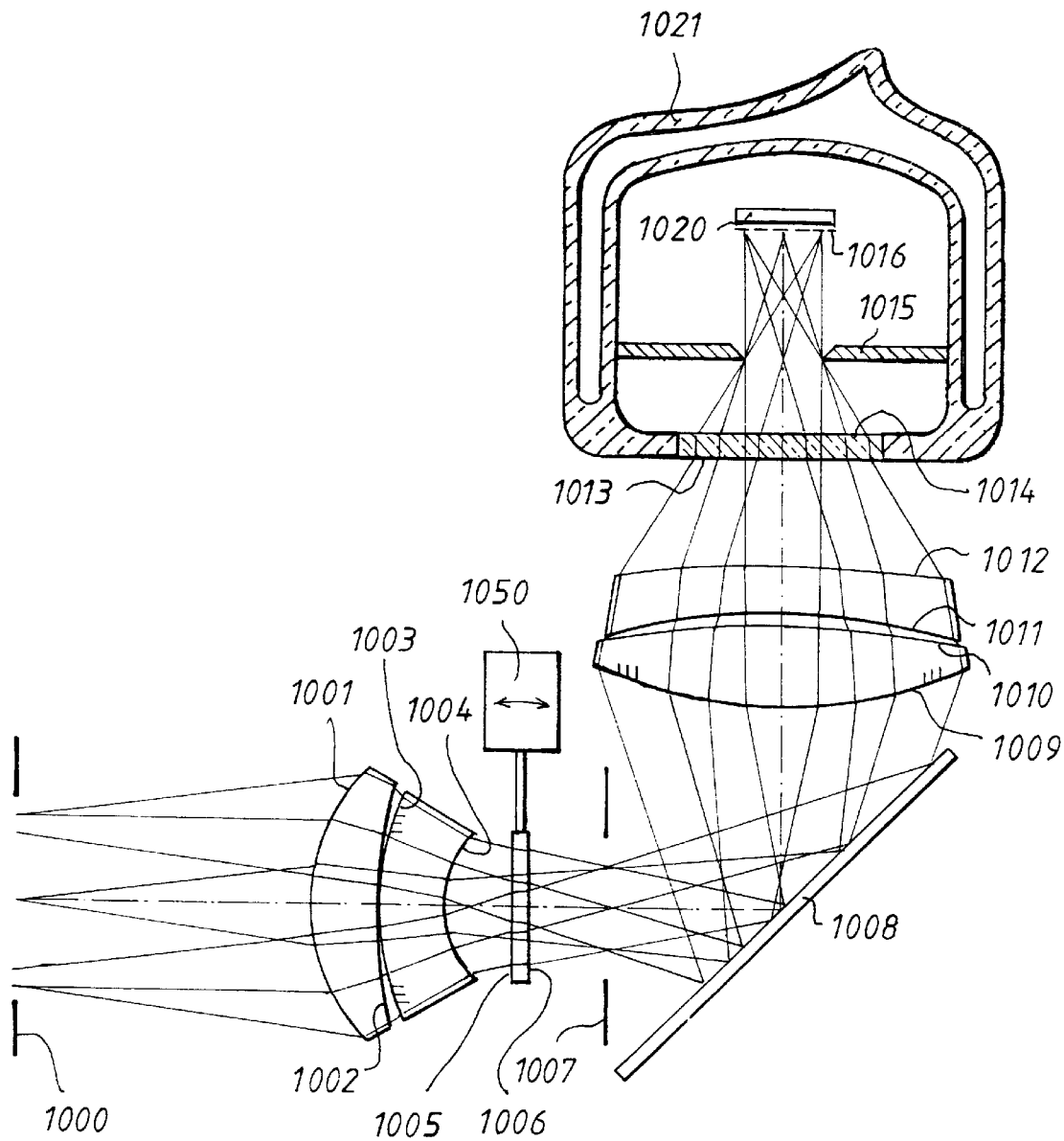
FIGS. 10 to 12 show lens section views for the three embodiments of Examples 8 to 10, respectively, which are provided for a two-dimensional IR detector in accordance with the HDTV standard; and, FIG. 13 shows the diffraction modulation transfer function (both tangentially and radially) for different ray elevations in Example 10.

The eighth embodiment of FIG. 10 has the data of Table 8. Reference numeral 1000 identifies the entry pupil. The deflecting mirror 1008 only serves to adapt to the geometry needed to accommodate the embodiment in a specific location. The deflecting mirror can otherwise be dispensed with. A similar mirror can be included in Examples 1 to 7 as may be required.

Here too, the detector 1020 is accommodated in the image plane 1016. The detector 1020 must be cooled and it is therefore mounted in a Dewar vessel 1021. The Dewar vessel 1021 includes a Ge entry window (1013, 1014) and the diaphragm 1015 in the exit pupil of the objective. A ZnSe plane-parallel plate (1005, 1006) is mounted rearward of the front objective (1001 to 1004) in order to increase the image resolution in accordance with the interlace method. The plane-parallel plate (1005, 1006) can be tilted by the drive 1050 so that the image in the image plane 1016 is laterally displaced approximately by half the pixel size (half the raster dimension of the detector array 1020). This part too can be omitted; however, the correction of the reimager must then be adapted.

The focal length is f'=42.88 mm, the stop number K=1.7, the entry pupil diameter is 25.22 mm, the image side numerical aperture NA'=0.294. The length from the detector plane 1016 up to the entry surface 1113 of the Ge entry window is 11.52 mm and half the object end field angle w'=7.65°.

The spectral range is, as in the previous examples, $\lambda$=7.5 $\mu$m to 10.5 $\mu$m and the temperature range includes T $\pm\Delta$T =20° C. $\pm$50° C.

Here too, four lenses with two aspheric surfaces (1003, 1009) are sufficient even though the transported light tube (product of aperture and field) is approximately increased by a factor of four.

Figure 11:
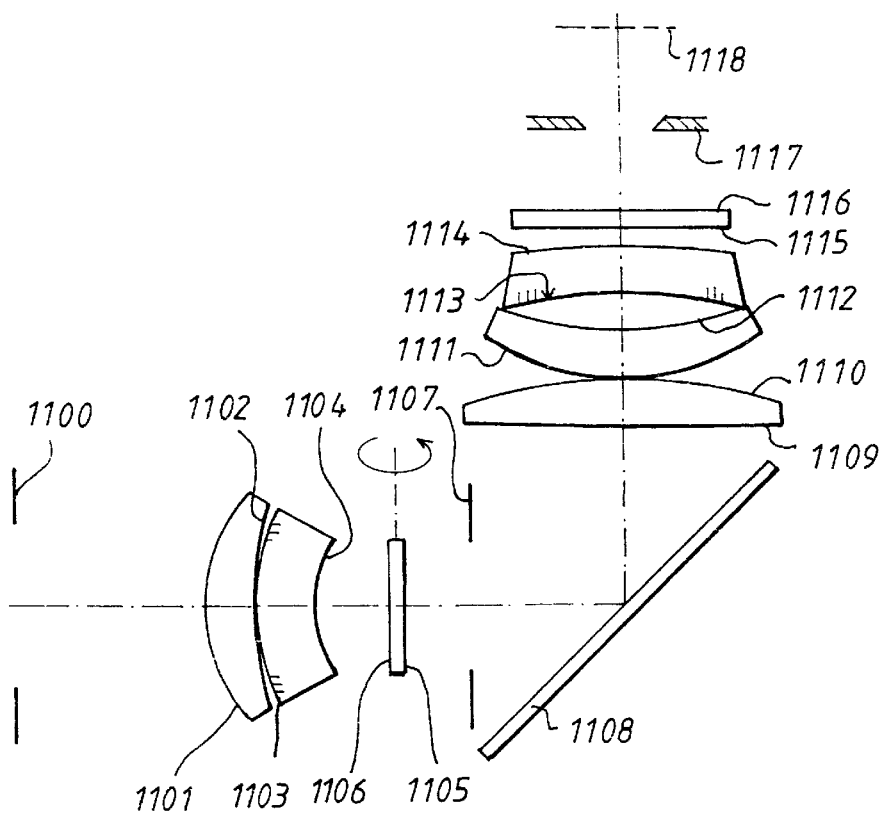

The ninth example of FIG. 11 has the data listed in Table 9 and, as the first embodiment, has a total of five lenses of which three are in the ocular. This embodiment is advantageous with respect to manufacture in that the aspheric surfaces 1103 and 1113 need not be machined into the chalcogenide glass IG6. In the embodiment 8 of FIG. 10, the second aspheric surface 1109 is on IG6 glass and is applied in a manner similar to the next embodiment.

Figure 12:
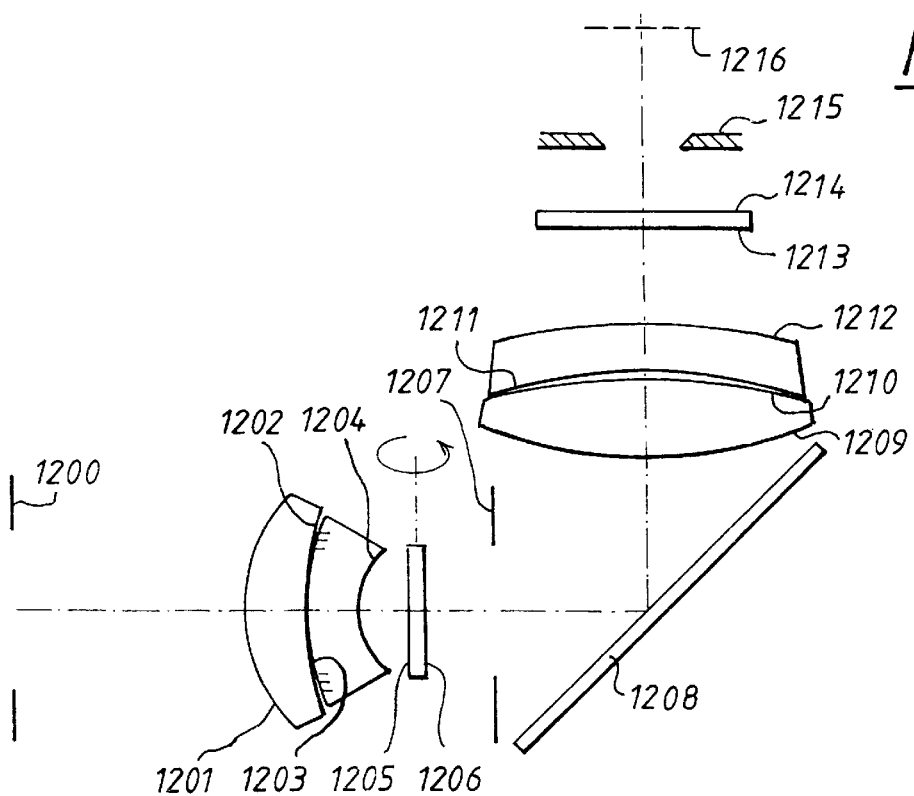

The tenth example of FIG. 12 has the data presented in Table 10 and includes four lenses. The embodiment of FIG. 12 substantially corresponds to the embodiment of FIG. 8 but is configured to have a shorter structural length. The length from the entry pupil (1000 or 1200) up to the image plane (1016 or 1216) is 210 mm in the Example 8 and is here only 200 mm for Example 10. A further reduction in structural length would mean a significant tightening of the system and would mean very tight manufacturing tolerances.

The embodiment of FIG. 11 is still somewhat shorter (195 mm) and can be shortened further but has one lens more and has the additional manufacturing complexity associated therewith.

Figure 13:
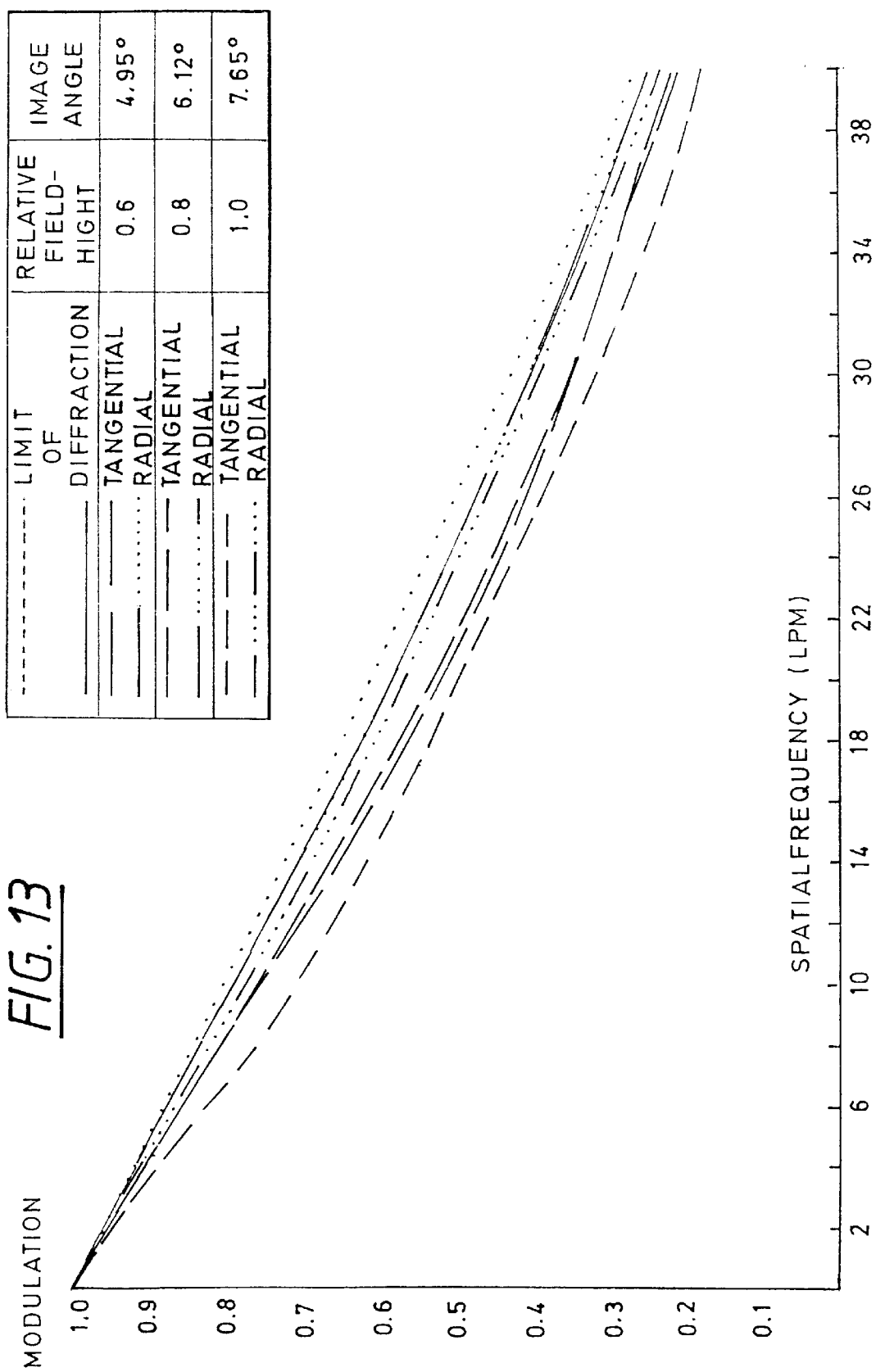

FIG. 13 shows the diffraction modulation transfer function for the tenth Example. Here too, the modulation loss is stable and low for a complete image angle.

For a temperature change of +50° C., the image position changes by $\Delta$s' and focal length changes by $\Delta$f'. The focal length change results in a maximum displacement of $\Delta$l' at the image edge. The depth of field is $\Delta$s'=$\pm$50 $\mu$m for the Examples 8 to 10. Table 11 presents the obtained athermalization for Examples 8 to 10. The frame material here is titanium.

The chromatic length deviation is provided as a listing in Table 12 as the position difference of the best adjusting plane $\Delta$BEE for the wavelengths 8 $\mu$m and 10.5 $\mu$m referred to a base wavelength of 9 $\mu$m.

For Examples 1 to 7, k =1.5 and therefore the depth of field =$\pm$2$\lambda$k$^2$ =$\pm$40 $\mu$m and for Examples 8 to 10, k=1.7 and therefore the depth of field =$\pm$2$\lambda$k$^2$=$\pm$50 $\mu$m are to be taken as a comparison scale.

The Examples presented show that a high resolution for chromatic and thermal correction below the limit of the depth of field is obtained with the many variations of the achrathermalized reimager of the invention.

It is understood that the foregoing description is that of the preferred embodiments of the invention and that various changes and modifications may be made thereto without departing from the spirit and scope of the invention as defined in the appended claims.

TABLE 1 f = 15 mm

| No. | Radius | | Thickness | Glass |
|---|---|---|---|---|
| 1 | 46.9760 | | 10.000 | |
| 2 | 25.0866 | Asphere | 2.500 | ZnSe |
| 3 | 21.9090 | | .500 | |
| 4 | 86.5960 | | 5.200 | IG6 |
| 5 | Planar | | 25.902 | |
| 6 | -5.5430 | | 15.823 | |
| 7 | -9.3057 | | 2.300 | ZnSe |
| 8 | 26.7990 | | .573 | |
| 9 | -33.7380 | | 3.500 | IG6 |
| 10 | 47.3241 | Asphere | .300 | |
| 11 | 101.4500 | | 1.900 | Ge |
| 12 | Planar | | 2.250 | |
| 13 | Planar | | 1.000 | Ge |
| 14 | Planar | | 2.000 | |
| 15 | Planar | | 8.750 | |

Aspheres:
Surface 2
Constants:
Apex radius   (y) = 25.08658   K (y) = .002340
Expansion Constants:
.8058753E-05   .3657305E-08   .2752318E-09   .0000000E+00
Surface 10
Constants:
Apex radius   (y) = 47.32405   K (y) = -.0440660
Expansion Constants:
-.6614489E-04   .1768410E-06   -.7598492E-08   .0000000E+00

TABLE 2

| NO. | Radius | | Thickness | Glass |
|---|---|---|---|---|
| 201 | 22.0670 | | 52.900 | |
| 202 | 60.8660 | | 3.600 | IG6 |
| 203 | −77.9635 | Asphere | 4.500 | |
| 204 | 100.0000 | | 2.500 | ZnSe |
| 205 | Planar | | 18.750 | |
| 206 | 13.0900 | Asphere | 28.290 | |
| 207 | 10.5930 | | 2.000 | ZnS |
| 208 | 12.1440 | | .600 | |
| 209 | 58.7150 | | 2.900 | IG6 |
| 210 | Planar | | 2.200 | |
| 211 | Planar | | 1.000 | Ge |
| 212 | Planar | | 2.000 | |
| 213 | Planar | | 8.750 | |

Aspheres:
Surface 203
Constants:
 Apex radius(y) = −77.96350    K(y) = −1.000
Expansion Constants:
−.72619900E−05  .6800200E−07  .0000000E+00  .0000000E+00
Surface 206
Constants:
 Apex radius(y) = 13.0900    K(y) = −1.000
Expansion Constants:
−.3150800E−06  .1383800E−06  .0000000E+00  .0000000E+00

TABLE 3

| No. | Radius | | Thickness | Glass |
|---|---|---|---|---|
| 301 | 42.2927 | Asphere | 63.439 | |
| 302 | 22.6631 | | 3.000 | ZnSe |
| 303 | 25.5188 | | 1.000 | |
| 304 | 647.0557 | | 4.800 | IG6 |
| 305 | Planar | | 23.811 | |
| 306 | −6.1262 | | 11.300 | |
| 307 | −21.3669 | | 5.000 | ZnSe |
| 308 | 17.0686 | Asphere | .200 | |
| 309 | −17.3063 | | 3.400 | IG6 |
| 310 | Planar | | .800 | |
| 311 | Planar | | 1.000 | Ge |
| 312 | Planar | | 2.000 | |
| 313 | Planar | | 8.750 | |

Aspheres:
Surface 301
Constants:
Apex radius  (y) = 42.29266  K (y) = −1.000000
Expansion Constants:
−.1582073E−05  −.4896612E−08  .0000000E+00  .0000000E+00
Surface 308
Constants:
Apex radius  (y) = 17.06862  K (y) = −1.000000
Expansion Constants:
−.3475706E−03  .2280306E−05  .4484519E−07  −.1462254E−08

TABLE 4

| No. | Radius | | Thickness | Glass |
|---|---|---|---|---|
| 401 | −599.0998 | Asphere | 44.718 | |
| 402 | 87.4600 | | 3.000 | ZnSe |
| 403 | 53.5957 | | 1.000 | |
| 404 | −87.8005 | | 4.800 | IG6 |
| 405 | Planar | | 27.982 | |
| 406 | 24.4608 | | 24.850 | |
| 407 | 13.1356 | | 5.000 | ZnSe |
| 408 | 10.8944 | Asphere | .200 | |
| 409 | −1271.9981 | | 3.400 | IG6 |
| 410 | Planar | | .800 | |
| 411 | Planar | | 1.000 | Ge |
| 412 | Planar | | 2.000 | |

TABLE 4-continued

| No. | Radius | | Thickness | Glass |
|---|---|---|---|---|
| 413 | Planar | | 8.750 | |

Aspheres:
Surface 401
Constants:
Apex radius  (y) = −599.09977  K (y) = −1.000000
Expansion Constants:
−.8428285E−05  −.3956574E−08  .0000000E+00  .0000000E+00
Surface 408
Constants:
Apex radius  (y) = 10.89437  K (y) = −1.000000
Expansion Constants:
−.5138828E−05  −.7401475E−07  .0000000E+00  .0000000E+00

TABLE 5

| No. | Radius | | Thickness | Glass |
|---|---|---|---|---|
| 501 | 44.1079 | | 49.220 | |
| 502 | −132.0159 | | 4.800 | IG6 |
| 503 | −64.8929 | | 1.000 | |
| 504 | −670.0914 | Asphere | 3.000 | ZnSe |
| 505 | Planar | | 23.480 | |
| 506 | 25.2586 | | 24.850 | |
| 507 | 14.0250 | | 5.000 | ZnSe |
| 508 | 11.0332 | Asphere | .200 | |
| 509 | 983.9787 | | 3.400 | IG6 |
| 510 | Planar | | .800 | |
| 511 | Planar | | 1.000 | Ge |
| 512 | Planar | | 2.000 | |
| 513 | Planar | | 8.750 | |

Aspheres:
Surface 504
Constants:
Apex radius  (y) = −670.09141  K (y) = −1.000000
Expansion Constants:
.4782106E−05  −.1625202E−07  .0000000E+00  .0000000E+00
Surface 508
Constants:
Apex radius  (y) = 11.03324  K (y) = −1.000000
Expansion Constants:
−.1089224E−04  .0000000E+00  .0000000E+00  .0000000E+00

TABLE 6

| No. | Radius | | Thickness | Glass |
|---|---|---|---|---|
| 601 | 21.7506 | | 53.979 | |
| 602 | 65.1818 | | 4.800 | IG6 |
| 603 | −111.3462 | | 1.500 | |
| 604 | 79.7375 | Asphere | 3.000 | ZnSe |
| 605 | Planar | | 19.721 | |
| 606 | 51.1790 | | 23.350 | |
| 607 | 23.6351 | | 5.000 | ZnSe |
| 608 | 11.0598 | Asphere | .200 | |
| 609 | 133.8056 | | 3.400 | IG6 |
| 610 | Planar | | .800 | |
| 611 | Planar | | 1.000 | Ge |
| 612 | Planar | | 2.000 | |
| 613 | Planar | | 8.750 | |

Aspheres:
Surface 604
Constants:
Apex radius  (y) = 79.73745  K (y) = −1.000000
Expansion Constants:
.39594870E−05  −.5457340E−07  .0000000E+00  .0000000E+00
Surface 608

TABLE 6-continued

| No. | Radius | Thickness | Glass |
|-----|--------|-----------|-------|

Constants:
Apex radius    (y) = 11.05978    K (y) = −1.000000
Expansion Constants:
−.2577051E−04    .0000000E+00    .0000000E+00    .0000000E+00

TABLE 7

| No. | Radius | | Thickness | Glass |
|-----|--------|--|-----------|-------|
| 701 | 21.3815 | | 52.856 | |
| 702 | 49.8447 | | 3.600 | IG6 |
| 703 | 800.0000 | Asphere | 1.000 | |
| 704 | 61.5954 | | 2.500 | ZnSe |
| 705 | Planar | | 22.544 | |
| 706 | 13.8307 | Asphere | 26.750 | |
| 707 | 11.0599 | | 2.200 | ZnS |
| 708 | 11.1423 | | .300 | |
| 709 | 52.5847 | | 3.000 | IG6 |
| 710 | Planar | | 1.000 | |
| 711 | Planar | | 1.000 | Ge |
| 712 | Planar | | 2.000 | |
| 713 | Planar | | 8.750 | |

Aspheres:
Surface 703
Constants:
Apex radius    (y) = 800.0000    K (y) = −1.000000
Expansion Constants:
−7141412E−05    .2451556E−07    .0000000E+00    .0000000E+00
Surface 706
Constants:
Apex radius    (y) = 13.8307    K (y) = −1.000000
Expansion Constants:
−.2700965E−04    −.2305985E−06    .0000000E+00    .0000000E+00

TABLE 8

| NO. | Radius | | Thickness | Glass |
|-----|--------|--|-----------|-------|
| 1001 | 28.7553 | | 43.145 | |
| 1002 | 69.8042 | | 9.406 | IG6 |
| 1003 | 35.6669 | Asphere | .200 | |
| 1004 | 14.1804 | | 9.427 | ZnSe |
| 1005 | Planar | | 9.538 | |
| 1006 | Planar | | 2.400 | |
| 1007 | Planar | | 11.000 | |
| 1008 | Planar | | 25.000 | |
| 1009 | 58.9472 | Asphere | 29.512 | |
| 1010 | −139.1986 | | 12.103 | IG6 |
| 1011 | −92.5450 | | 1.720 | |
| 1012 | −164.2894 | | 7.500 | ZnS |
| 1013 | Planar | | 16.000 | |
| 1014 | Planar | | 3.000 | Ge |
| 1015 | Planar | | 10.870 | |
| 1016 | Planar | | 19.180 | |

Aspheres:
Surface 1003
Constants:
  Apex radius(y) = 35.66689    K(y) = −1.00000
Expansion Constants:
−.4340770E−05    −.7385080E−08    .4664680E+11    .0000000E+00
Surface 1009
Constants:
  Apex radius(y) = 58.94719    K(y) = −1.000000
Expansion Constants:
−.138106E−05    .375062E−09

TABLE 9

| No. | Radius | | Thickness | Glass |
|-----|--------|--|-----------|-------|
| 1101 | 28.2915 | | 31.600 | |
| 1102 | 58.6324 | | 7.742 | IG6 |
| 1103 | 34.9668 | Asphere | .200 | |
| 1104 | 16.1384 | | 9.157 | ZnSe |
| 1105 | Planar | | 11.909 | |
| 1106 | Planar | | 2.400 | ZnSe |
| 1107 | Planar | | 11.000 | |
| 1108 | Planar | | 25.000 | |
| 1109 | 574.8175 | | 29.056 | |
| 1110 | 89.6436 | | 8.358 | IG6 |
| 1111 | 35.3622 | | .200 | |
| 1112 | 52.0841 | | 7.877 | IG6 |
| 1113 | −68.7404 | Asphere | 6.688 | |
| 1114 | −245.3063 | | 7.500 | ZnS |
| 1115 | Planar | | 3.263 | |
| 1116 | Planar | | 3.000 | Ge |
| 1117 | Planar | | 13.187 | |
| 1118 | Planar | | 16.863 | |

Aspheres:
Surface 1103
Constants:
Apex radius    (y) = 34.96675    K (y) = −1.000000
Expansion Constants:
−.2695330E−05    −.3936930E−08    .0000000E+00    .0000000E+00
Surface 1113
Constants:
Apex radius    (y) = 68.74035    K (y) = −1.000000
Expansion Constants:
.474055E−05    −.278672E−08

TABLE 10

| No. | Radius | | Thickness | Glass |
|-----|--------|--|-----------|-------|
| 1201 | 27.3651 | | 38.379 | |
| 1202 | 67.4190 | | 9.798 | IG6 |
| 1203 | 34.0009 | Asphere | .200 | |
| 1204 | 13.5531 | | 8.440 | ZnSe |
| 1205 | Planar | | 7.946 | |
| 1206 | Planar | | 2.400 | ZnSe |
| 1207 | Planar | | 11.000 | |
| 1208 | Planar | | 25.000 | |
| 1209 | 60.0748 | Asphere | 25.705 | |
| 1210 | −118.4977 | | 12.361 | IG6 |
| 1211 | −82.1878 | | 1.721 | |
| 1212 | −137.3286 | | 7.500 | ZnS |
| 1213 | Planar | | 16.500 | |
| 1214 | Planar | | 3.000 | Ge |
| 1215 | Planar | | 10.304 | |
| 1216 | Planar | | 19.746 | |
| | | | .000 | |

Aspheres:
Surface 1203
Constants:
Apex radius    (y) = 34.00089    K (y) = −1.000000
Expansion Constants:
−.6158900E−05    −.1050430E−07    .8665520E+00    .0000000E+00
Surface 1209
Constants:
Apex radius    (y) = 60.07483    K (y) = −1.000000
Expansion Constants:
−.165072E−05    .47796E−09

TABLE 11

| Example | Δs' | Δf | Δl' |
|---|---|---|---|
| 8 | ±0.00 mm | +0.15% | +9μ |
| 9 | ±0.00 mm | +0.16% | +9μ |
| 10 | −0.02 mm | +0.07% | +4μ |

TABLE 12

| Example | $\Delta BEE_{8\mu}$ | $\Delta BEE_{10.5\mu}$ |
|---|---|---|
| 1 | −25μ | +30μ |
| 2 | ≈0 | +10μ |
| 3 | −15μ | +25μ |
| 4 | −15μ | +15μ |
| 5 | −25μ | +15μ |
| 6 | −25μ | +25μ |
| 7 | ≈0 | ≈0 |
| 8 | −30μ | ≈0 |
| 9 | −20μ | −20μ |
| 10 | −30μ | ≈0 |

What is claimed is:

1. An achrathermalized reimager comprising:
   a front objective defining an optical axis;
   a relay optic arranged on said optical axis downstream of said front objective;
   said front objective being both achromatic and athermalized including precisely one negative lens made of a material selected from the group consisting of ZnSe and ZnS and one positive lens made of chalcogenide glass.

2. The achrathermalized reimager of claim 1, wherein said chalcogenide glass is selected from the group consisting of IG6 and IG4 glass.

3. The achrathermalized reimager of claim 1, wherein said relay optic includes no more than three lenses.

4. The achrathermalized reimager of claim 3, wherein said relay optic includes: a negative lens made of a material selected from the group consisting of ZnSe or ZnS; and, a positive lens made of said chalcogenide glass.

5. The achrathermalized reimager of claim 4, said front objective and said relay optic are each individually configured to be achromatic and athermalized.

6. The achrathermalized reimager of claim 5, wherein said reimager defines an exit pupil downstream of said relay optic; said relay optic includes a last lens farthest away from said front objective; and, said reimager further comprises a plane-parallel plate disposed on said optical axis between said last lens and said exit pupil.

7. The achrathermalized reimager of claim 6, said reimager further comprising a cooling housing and defining an image plane in said cooling housing; an IR detector mounted in said cooling housing in said image plane; said exit pupil being at a spacing forward of said image plane which corresponds to 4 to 8 times the half image diagonal.

8. The achrathermalized reimager of claim 6, wherein said front objective and said relay optic conjointly define an intermediate image plane therebetween and said reimager further comprising a narciss diaphragm in said image plane.

9. The achrathermalized reimager of claim 6, wherein said reimager is operable in a maximum variation of focal length at all temperatures in the range of from −40° C. to +70° C. and wavelengths of 7.5 μm to 10.5 μm of ±5%.

10. The achrathermalized reimager of claim 9, wherein the maximum focal intercept difference lies within the diffraction limited depth of field.

11. The achrathermalized reimager of claim 6, wherein said plane-parallel plate is made of germanium.

12. The achrathermalized reimager of claim 11, wherein said plane-parallel plate is mounted upstream of said front objective.

13. The achrathermalized reimager of claim 12, wherein said plane-parallel plate can be tilted; a two-dimensional raster IR detector is mounted in the image plane; and, wherein an increase in resolution is effected when said plane-parallel plate is tilted.

14. The achrathermalized reimager of claim 5, wherein said lenses of said front objective are made of only two different materials.

15. The achrathermalized reimager of claim 14, wherein all lenses are made of only two different materials.

16. The achrathermalized reimager of claim 1, wherein said reimager has a total refractive power; and, each of said lenses has a refractive power no more than 2.2 times said total refractive power.

17. The achrathermalized reimager of claim 16, wherein said positive lens is made of chalcogenide glass.

18. The achrathermalized reimager of claim 1, wherein said lenses of said reimager have two aspheric lens surfaces.

19. The achrathermalized reimager of claim 18, wherein a first one of said aspheric lens surfaces is in said front objective.

20. The achrathermalized reimager of claim 18, wherein the form of aspherical lens surfaces is defined in a mathematical representation of arrow height (p) as a function of the lens radius (H) given as a power series having only even powers.

21. An achrathermalized reimager comprising:
   precisely four lenses;
   first and second ones of said four lenses defining a front objective and third and fourth ones of said four lenses defining a relay optic;
   said first and said third lenses each being a positive lens and said second and said fourth lenses each being a negative lens; and,
   said second and fourth lenses each being made of ZnSe or ZnS.

22. A reimager having an intermediate image comprising:
   four or five lenses configured such that the reimager is achromatic over more than 80% of the depth of field for a wavelength range including 8 to 10 μm; and,
   said lenses being configured to be athermal over a temperature range of at least ±30° C. referred to the normal temperature 20° C. and over more than 60% of the depth of field.

23. A reimager having an intermediate image comprising:
   four or five lenses configured such that the reimager is achromatic over more than 65% of the depth of field for a wavelength range including 7.5 to 10.5 μm; and,
   said lenses being configured to be athermal over a temperature range of at least −40° C. to +70° C. and over more than 60% of the depth of field.

* * * * *